(12) United States Patent
Pilloy

(10) Patent No.: US 7,758,966 B2
(45) Date of Patent: Jul. 20, 2010

(54) MIRROR

(75) Inventor: Georges Pilloy, Jumet (BE)

(73) Assignee: AGC Glass Europe, Brussels (BE)

( * ) Notice: Subject to any disclaimer, the term of this patent is extended or adjusted under 35 U.S.C. 154(b) by 538 days.

(21) Appl. No.: 10/599,004

(22) PCT Filed: Mar. 15, 2005

(86) PCT No.: PCT/EP2005/051164

§ 371 (c)(1), (2), (4) Date: May 8, 2007

(87) PCT Pub. No.: WO2005/090256

PCT Pub. Date: Sep. 29, 2005

(65) Prior Publication Data

US 2007/0281169 A1    Dec. 6, 2007

(30) Foreign Application Priority Data

Mar. 18, 2004 (EP) .................................. 04101118
Dec. 16, 2004 (EP) .................................. 04106618

(51) Int. Cl.
*B32B 17/06* (2006.01)

(52) U.S. Cl. ................... 428/433; 428/432; 428/434; 428/689; 428/697; 428/699; 428/701; 428/702; 428/912.2

(58) Field of Classification Search ................. 428/426, 428/432, 433, 434, 457, 469, 688, 689, 697, 428/699, 701, 702, 912.2
See application file for complete search history.

(56) References Cited

U.S. PATENT DOCUMENTS

| 4,894,278 A | 1/1990 | Servais et al. |
| 5,215,382 A | 6/1993 | Kemeny |
| 6,251,482 B1 * | 6/2001 | Laroche et al. ............. 427/304 |
| 6,565,217 B2 | 5/2003 | Laroche et al. |

* cited by examiner

*Primary Examiner*—Gwendolyn Blackwell
(74) *Attorney, Agent, or Firm*—Oblon, Spivak, McClelland, Maier & Neustadt, L.L.P.

(57) ABSTRACT

A mirror with no copper layer comprises a glass substrate; a silver coating layer provided at a surface of the glass substrate; at least one material selected from the group consisting of Pd, Ni, Eu, Pt, Ru, Na, Zr, Y and Rh, provided at a surface of the silver coating layer which is adjacent to a paint layer; and at least one paint layer covering the silver coating layer.

24 Claims, No Drawings

MIRROR

CROSS-REFERENCE TO RELATED APPLICATIONS

This application is the national stage entry of International Application No. PCT/EP/2005/051164, filed 15 Mar. 2005, which claims priority to European Application No. 04101118.0 filed 18 Mar. 2004, and European Application No. 04106618.4, filed 16 Dec. 2004; the disclosures of all of which are hereby incorporated by reference.

BACKGROUND

I. Technological Field

This invention relates to mirrors and to a process of manufacturing mirrors.

The mirrors of this invention may have various applications, for example: domestic mirrors used for example in furniture, wardrobes or bathrooms; mirrors in make-up boxes or kits; mirrors used in the automotive industry, as rear-view mirrors for cars, for example. Such mirrors may be produced by applying a silver coating on glass sheets, particularly on soda lime glass, flat glass or float glass.

II. Description of Related Art

Conventionally, silver mirrors have been produced as follows: the glass was first of all polished and then sensitised, typically using an aqueous solution of $SnCl_2$; after rinsing, the surface of the glass was usually activated by means of an ammoniacal silver nitrate treatment, and a silvering solution was then applied in order to form an opaque coating of silver; this silver coating was then covered with a protective layer of copper and then with one or more coats of leaded paint in order to produce the finished mirror. The combination of the protective copper layer and the leaded paint was deemed necessary to provide acceptable aging characteristics and sufficient corrosion resistance.

SUMMARY

More recently, Glaverbel developed mirrors which dispensed with the need for the conventional copper layer, which could use substantially lead-free paints and yet which still had acceptable or even improved aging characteristics and corrosion resistance. For example, U.S. Pat. No. 6,565,217 describes embodiments of a mirror with no copper layer which comprises in the order recited: a vitreous substrate; both tin and at least one material selected from the group consisting of palladium, bismuth, chromium, gold, indium, nickel, platinum, rhodium, ruthenium, titanium, vanadium and zinc provided at a surface of the vitreous substrate; a silver coating layer on said surface of the substrate; at least one material selected from the group consisting of tin, chromium, vanadium, titanium, iron, indium, copper and aluminum present at the surface of the silver coating layer which is adjacent to an at least one paint layer; and at least one paint layer covering the silver coating layer. Such mirrors provided a significant advance with respect to conventional coppered mirrors.

BRIEF SUMMARY

According to one of its aspects, the present invention provides a mirror with no copper layer as defined by claim 1. Other claims define preferred and/or alternative aspects of the invention.

The invention provides an alternative mirror structure. In addition, this structure may reduce the risk and/or the occurrence of diffusing spots on the mirrors. Such diffusing spots may be in the form of small holes or small spots of corrosion in the silver layer and may give rise to a diffusing aspect and/or a visible irregularity in the reflecting aspect of the mirror. They may be directly visible with the naked eyes or in a dark room under a spot light, either directly at the end of the mirror manufacturing line or may appear after for example 10 to 20 days storage. Such defects may occur intermittently in some prior art mirrors but their cause has not been clearly identified.

Mirrors according to the invention comprise at least one material selected from the group consisting of palladium, lanthanum, nickel, europium, zinc, platinum, ruthenium, rhodium, sodium, zirconium, yttrium and cerium, provided at the surface of the silver coating layer which is adjacent to the at least one paint layer overlaying the silver coating layer. Preferably, palladium is present at the surface of the silver coating layer. Alternatively, the at least one material selected from the group consisting of palladium, lanthanum, nickel, europium, zinc, platinum, ruthenium, rhodium, sodium, zirconium, yttrium and cerium is provided together with at least one material selected from the group consisting of tin, chromium, vanadium, titanium, iron, indium, copper and aluminium at the surface of the silver coating layer which is adjacent to the paint layer overlaying the silver coating layer. Preferably, both palladium and tin are provided at the surface of the silver coating layer which is adjacent to the paint layer overlaying the silver coating layer.

Preferably, the material provided at the surface of the silver coating layer which is adjacent to the paint layer overlaying the silver coating layer is present in a quantity of less than 0.5, or less than 0.4, or preferably, less than 0.3 mg/m$^2$ of glass.

DETAILED DESCRIPTION

Mirrors according to the invention preferably have good aging and corrosion resistance, preferably at least comparable to the aging and corrosion resistance of mirrors of the type described in U.S. Pat. No. 6,565,217. In addition, such mirrors may have a lower occurrence and/or a lower risk and/or be less sensitive to factors which could provoke diffusing spots. Most preferably, such mirrors do not have any diffusing spots, or at least do not have any diffusing spots which are visible with the naked eye.

Advantageously, one or more material may be deposited during an activating step on a surface of the glass substrate on which the silver layer is to be deposited; this may contribute to the corrosion resistance of the mirror. Such materials may be selected from the group consisting of bismuth, chromium, gold, indium, nickel, palladium, platinum, rhodium, ruthenium, titanium, vanadium and zinc. Palladium is preferred. Tin may be provided at or on a surface of the glass substrate on which the silver layer is to be deposited; this may sensitise the glass substrate and may facilitate adhesion of the silver layer thereto. The glass substrate may be sensitised prior to being activated, activated prior to being sensitised or sensitised and activated simultaneously.

Materials provided at the surface of the glass substrate during an activating and/or sensitising step are preferably provided as islets, that is to say that preferably they do not produce a distinct continuous layer of, for example, palladium, but that the material is in the form of islets on the surface of the glass. The same may apply to materials provided at the surface of the silver coating layer which is adjacent to the paint layer.

Preferably, the silver coating layer has a thickness in the range 60 to 110 nm, more preferably 70 to 100 nm. These values offer a good compromise between a good light reflection value for the mirror and an acceptable cost of production.

In one preferred embodiment, the paint layer or at least one of the paint layers, preferably at least the exposed outermost paint layer, applied over the silver layer is lead-free or substantially lead-free. Conventionally, silver coating layers of mirrors were protected by an overcoat of copper. The copper layer was itself protected from abrasion and corrosion by a layer of paint. The paint formulations which afforded acceptable levels of protection against aging and/or corrosion contained lead pigments. The proportion of lead in such a leaded paint layer could be around 13000 mg/m$^2$. The mirrors according to the present invention not only dispense with the need for a copper layer but they also allow the use of paints which are substantially lead-free. This is advantageous in that lead is toxic and its avoidance has environmental benefits. Substantially lead-free means herein that the proportion of lead in the paint is significantly less than the proportion of lead in leaded paints conventionally used for mirrors. The proportion of lead in a substantially lead-free paint layer as herein defined is less than 500 mg/m$^2$, preferably less than 400 mg/m$^2$, more preferably less than 300 mg/m$^2$. The present invention may offer the advantage of using a lead-free paint, while still having good aging and corrosion resistance, preferably at least comparable to the aging and corrosion resistance of mirrors of the type described in U.S. Pat. No. 6,565,217. It may also offer the advantage of using a substantially lead-free paint of reduced thickness, while still having good aging and corrosion resistance, preferably at least comparable to the aging and corrosion resistance of mirrors of the type described in U.S. Pat. No. 6,565,217.

Traces of silane may be present at the surface of the silver coating layer which is provided adjacent to the at least one paint layer covering the silver coating layer. The treatment of the silver coating layer with a silane before painting may enhance and/or contribute towards the resistance of the mirror to abrasion and/or corrosion.

Mirrors according to the present invention preferably also have an acceptable or even improved resistance to aging and/or corrosion; this is defined with reference to the CASS test and/or with reference to the Salt Fog Test. They may also have an acceptable or even improved adherence of the silver layer on the glass; this is defined with reference to the Clement test.

One indication of the corrosion resistance and/or resistance to aging of a mirror incorporating a silver film can be given by subjecting it to a copper-accelerated acetic acid salt spray test known as the CASS test in which the mirror is placed in a testing chamber at 50° C. and is subjected to the action of a fog formed by spraying an aqueous solution containing 50 g/l sodium chloride, 0.26 g/l anhydrous cuprous chloride with sufficient glacial acetic acid to bring the pH of the sprayed solution to between 3.1 and 3.3. Full details of this test are set out in International Standard ISO 9227-1990. Mirrors may be subjected to the action of the saline fog for different lengths of time, whereafter the reflective properties of the artificially aged mirror may be compared with the reflective properties of the freshly formed mirror. An exposure time of 120 hours gives a useful indication of the resistance of a mirror to aging. The CASS test is performed on 10 cm square mirror tiles having freshly cut edges, and after exposure to the copper-accelerated acetic acid salt spray for 120 hours, each tile is subjected to microscopic examination. The principal visible evidence of corrosion is a darkening of the silver layer and peeling of the paint around the margins of the mirror. The extent of corrosion is noted at five regularly spaced sites on each of two opposed edges of the tile and the mean average of these ten measurements is calculated. One can also measure the maximum corrosion present at the margin of the tile to obtain a result which is again measured in micrometers; preferably, the maximum corrosion is less than 300 µm, more preferably less than 250 µm or less than 200 µm. For a more representative evaluation, the CASS test may be performed on ten samples of a mirror and the mean average of the ten samples calculated from the mean average of each sample.

Another indication of the corrosion resistance and/or resistance to aging of a silver mirror can be given by subjecting it to a Salt Fog test which consists in subjecting the mirror to the action, in a chamber maintained at 35° C., of a salt fog formed by spraying an aqueous solution containing 50 g/l sodium chloride. An exposure time of 480 hours to the Salt Fog test gives a useful indication of the resistance of a mirror to aging. Full details of this test are set out in International Standard ISO 9227-1990. The mirror is again subjected to microscopic examination, and the corrosion present at the margin of the tile is measured to obtain a result in micrometers, in the same way as in the CASS test; preferably, the maximum corrosion is less than 100 µm, more preferably less than 50 µm. For a more representative evaluation, the Salt Fog test may be performed on five samples of a mirror and the mean average of the five samples calculated from the mean average of each sample.

Another evidence of corrosion of mirrors is the apparition of white specks, visible under an optical microscope, after the CASS and/or Salt Fog tests. These white specks, already defined in U.S. Pat. No. 6,565,217, are different from the diffusing spots herein described. Preferably, mirrors according to the present invention have less than ten white specks per dm$^2$ following the CASS test and/or Salt Fog test, more preferably, less than five white specks per dm$^2$, or less than one white speck per dm$^2$.

The Clemen test may be used to evaluate the adherence of the silver layer on the glass. A tungsten carbide tipped needle is pressed onto the mirror paint by applying a load on the needle. Full details of this test are set out in International Standard ISO 1518-1992. The Clemen test is here performed with a needle of 2 mm width and a weight of 2000 g: mirrors according to the present invention preferably show their silver coating not pulled out by the test, whereas mirrors where the treatment of the silver coating layer according to the invention is omitted, may show their silver layer pulled out by the test.

In methods of manufacturing mirrors according to certain aspects of the invention, the sensitising, activating and passivating steps may contribute to the aging and/or corrosion resistance of the mirrors and/or to their durability. Preferably the sensitising step is carried out prior to the activating step and the activating step before silvering. Preferably, the solutions brought into contact with the glass substrate during the successive manufacturing steps are sprayed onto the glass substrate with optional intervening rinsing and/or washing steps.

For example, during the industrial manufacture of flat mirrors, sheets of glass may pass through successive stations where sensitisation, activation, silvering and passivating reagents are sprayed. In practice, on a mirror production line, the sheets of glass are generally conveyed along a path by a roller conveyor. They are first of all polished and rinsed prior to being sensitised by means for example of a tin chloride solution sprayed on the glass; they are then rinsed again. An activating solution is then sprayed onto the sheets of glass, this activating solution may be for example, an acidic aqueous solution of PdCl$_2$. The sheets of glass then pass to a rinsing station where demineralised water is sprayed, and then to the silvering station where a traditional silvering solution is sprayed, the silvering solution being combined just before application to the glass from two solutions, one solution comprising a silver salt and either a reducing agent or a base and the other solution comprising whichever component (a reducing agent or a base) which is absent from the solution containing the silver salt. The flow rate and concentration of the silvering solution sprayed onto the glass are controlled so as to form a layer of silver of a desired thickness, for example containing between 700 and 900 mg/m$^2$ of silver, preferably in the range 800-850 mg/m$^2$ of silver. The glass is then rinsed and directly after the rinsing of the silver coating, an aqueous solution of for example palladium chloride is sprayed onto the silvered glass sheets as they move forward along the conveyor. Preferably the quantity of palladium in the sprayed solution is comprised between 0.2 and 20 mg/l, more preferably between 1 and 5 mg/l. After a further rinsing, the mirrors may then be treated by spraying with a solution containing a silane. After rinsing and drying, the mirrors are covered with one or more paint layers. The paint may be, for example, alkyd based paints, or epoxy paints. The paint is then cured or dried, for example in a tunnel oven. Preferably, the paint is applied onto the silvered substrates in the form of a continuous curtain of liquid paint falling onto the glass sheets in a curtain coating process.

In one preferred embodiment, the passivating solution comprises a source of palladium, most preferably a palladium (II) salt in aqueous solution, in particular $PdCl_2$ in acidified aqueous solution. The $PdCl_2$ solution may have a concentration of from 5 to 130 mg/l. Bringing the silvered glass substrate into contact with a quantity of from 0.3 to 15 mg, preferably from 0.5 to 5 mg of $PdCl_2$, per square metre of glass may be entirely sufficient to passivate the silvered glass substrate effectively. Preferably, the pH of said passivating solution is from 2.0 to 7.0, most preferably from 3.0 to 5.0. This pH range allows solutions to be formed which are both stable and effective for passivating the glass. For example, when using palladium above pH=5.0, there is a risk of precipitation of palladium hydroxide.

The thickness of the glass substrate may be greater than 1 mm, 2 mm or 2.5 mm; it may be less than 10 mm, 8 mm or 6 mm. The thickness of the glass substrate may be within the range of 1.8 mm to 8.2 mm.

The finished mirror may have a luminous reflectance of greater than 85%, preferably greater than 90% measured through the glass substrate. The luminous reflection may be less than 98%, less than 96% or less than 95%.

Embodiments of the invention will now be further described, by way of example only, along with comparative examples.

Example 1 & Comparative Example 1

A mirror according to the invention is manufactured on a conventional mirror production line in which a flat sheet of soda lime float glass is conveyed along the line by a roller conveyor.

The sheet of glass is first of all polished, rinsed and then sensitised by means of a tin chloride solution, in the usual manner; it is then rinsed again. An acidic aqueous solution of $PdCl_2$ is then sprayed onto the sheet of glass following the teaching of U.S. Pat. No. 6,565,217. The sheet of glass then passes to a rinsing station where demineralised water is sprayed, and then to the silvering station where a traditional silvering solution is sprayed to form a layer containing approximately 800-850 mg/m2 of silver. The glass is then rinsed by spraying with water and, directly after the rinsing of the silver coating, a freshly formed aqueous acidified solution of $PdCl_2$ is sprayed onto the silvered glass sheet at a rate of around 0.7 mg $PdCl_2$/m$^2$. The $PdCl_2$ solution has a concentration of 70 mg/l and a pH of 4. The mirror is then treated by spraying with a solution containing 0.1% by volume of γ-aminopropyl triethoxysilane (Silane A 1100 from Union Carbide). After rinsing and drying, the mirror is curtain coated with a two-layers paint coating comprising a first coat of approximately 25 μm and a second coat of approximately 30 μm, both of a substantially lead-free alkyd based paint.

A comparative example not in accordance with the invention is manufactured as described above (example 1), except that after the silvering step and rinsing, a freshly formed acidified solution of $SnCl_2$ is sprayed onto the silvered glass sheet. Comparative example 1 corresponds to a copperless mirror as previously known.

Mirrors manufactured in this manner are subjected to CASS test and Salt Fog test. The results of the tests on the mirrors of example 1 and the comparative example are as set out in table I. These show comparable values at CASS and Salt Fog tests, with the advantage for the mirror according to this invention of having a reduced number of diffusing spots.

TABLE I

| | Example 1: Passivating solution comprises Pd— substantially lead-free paint layers | Comparative example 1: Passivating solution comprises Sn—substantially lead-free paint layers |
|---|---|---|
| CASS test average in μm | 140 | 132 |
| Salt Fog test average in μm | 23 | about 30 |
| Number of diffusing spots | <1/m$^2$ | 5/m$^2$ |

Examples 2 to 4 & Comparative Example 2

Example 2 is manufactured as described in example 1, except that:
 the solution sprayed onto the silvered glass sheet after the silvering step and rinsing, is a solution of $Zr(SO_4)_2$ with a concentration of 2.83 g/l and a pH of less than 3;
 the two-layers paint coating comprises two layers of lead-free paint.

Example 2 shows a CASS test average value of 232 and a number of diffusing spots inferior to 1/m$^2$.

Example 3 is manufactured as described in example 2, except that:
 the solution sprayed onto the silvered glass sheet after the silvering step and rinsing, is a solution of $YCl_3 6H_2O$ with a concentration of 3.03 g/l and a pH of 2.4.

Example 3 shows a CASS test average value of 245 and a number of diffusing spots inferior to 1/m$^2$.

Example 4 is manufactured as described in example 2, except that:
 the solution sprayed onto the silvered glass sheet after the silvering step and rinsing, is a solution of PdCl2 with a concentration of 0.95 mg/l and a pH of 4;
 the total thickness of the two layers of lead-free paint is 49 μm.

Example 4 shows a CASS test average value of 233 and a number of diffusing spots inferior to $1/m^2$.

Comparative example 2 is manufactured as described in example 2, except that:

- the solution sprayed onto the silvered glass sheet after the silvering step and rinsing, is an acidified solution of SnCl2 with a concentration of 490 mg/l;
- the total thickness of the two layers of lead-free paint is 50 μm.

Comparative example 2 shows a CASS test average value of 406 and a number of diffusing spots around $5/m^2$.

Table II resumes the results of examples 2-4 in comparison with comparative example 2. This illustrates the advantage of the invention, in terms of corrosion resistance and/or resistance to aging, when using a lead-free paint to protect the mirror.

TABLE II

|  | Ex 2 | Ex 3 | Ex 4 | Comp. ex 2 |
|---|---|---|---|---|
| Passivating solution comprises: | Zr | Y | Pd | Sn |
| Paint layers: | <---------- lead-free ----------> | | | |
| CASS test average in μm: | 232 | 245 | 233 | 406 |

Example 5

Example 5 is manufactured as described in example 4, except that the total thickness of the two layers of lead-free paint is lowered to 33 μm. It shows a CASS test average value of 205 and a number of diffusing spots inferior to $1/m^2$. This example illustrates the advantage of the invention in terms of corrosion resistance and/or resistance to aging, even when using a thinner lead-free paint to protect the mirror.

Examples 6 to 9

Example 6 is manufactured as described in example 1, except that:

- the solution sprayed onto the silvered glass sheet after the silvering step and rinsing, is a solution of PdCl$_2$ with a concentration of 1.02 mg/l;
- the two-layers paint coating comprises two layers of substantially lead-free paint, for a total thickness of 54 μm.

Example 6 shows a CASS test average value of 120 and a number of diffusing spots inferior to $1/m^2$.

Example 7 is manufactured as described in example 6, except that the thickness of the first paint layer is reduced so that the total thickness of the two paint layers is 48 μm. Example 7 shows a CASS test average value of 109 and a number of diffusing spots inferior to $1/m^2$. CASS test results are similar when the thicknesses of both paint layers are reduced or the thickness of the second paint layer alone is reduced to obtain a similar total thickness.

Example 8 is manufactured as described in example 6, except that:

- the solution sprayed onto the silvered glass sheet after the silvering step and rinsing, is a mixed solution of SnCl2 with a concentration of 500 mg/l, together with PdCl$_2$ with a concentration of 0.69 mg/l;
- the total thickness of the two layers is 55 μm.

Example 8 shows a CASS test average value of 136 and a number of diffusing spots inferior to $1/m^2$.

Example 9 is manufactured as described in example 8, except that the thickness of the second paint layer is reduced so that the total thickness of the two paint layers is 47 μm. Example 9 shows a CASS test average value of 114 and a number of diffusing spots inferior to $1/m^2$. CASS test results are similar when the thicknesses of both paint layers are reduced or the thickness of the first paint layer alone is reduced to obtain a similar total thickness.

Table III resumes the results of examples 6-9 in comparison with comparative example 1. This exemplifies the advantage of the invention, in terms of corrosion resistance and/or resistance to aging, when using a thinner substantially lead-free paint to protect the mirror.

TABLE III

|  | Ex 6 | Ex 7 | Ex 8 | Ex 9 | Comp. ex 1 |
|---|---|---|---|---|---|
| Passivating solution comprises: | Pd | Pd | Pd and Sn | Pd and Sn | Sn |
| Paint layers: | <---------- Substantially lead-free ----------> | | | | |
| Paint layers total thickness [μm] | 54 | 48 | 55 | 47 | 55 |
| CASS test average in μm: | 120 | 109 | 136 | 114 | 132 |

The invention claimed is:

1. A mirror which comprises:
   a glass substrate;
   a silver coating layer provided at a surface of the glass substrate;
   at least one material selected from the group consisting of Pd, Eu, Pt, Ru, Na, Zr, Y and Rh, provided at a surface of the silver coating layer which is adjacent to a paint layer; and
   at least one paint layer covering the silver coating layer, wherein the mirror has no copper layer.

2. The mirror according to claim 1, wherein at least one material selected from the group consisting of Bi, Cr, Au, In, Ni, Pd, Pt, Rh, Ru, Sn, Ti, V and Zn is provided at the surface of the glass substrate adjacent to the silver layer.

3. The mirror according to claim 2, wherein both Sn and at least one material selected from the group consisting of Bi, Cr, Au, In, Ni, Pd, Pt, Rh, Ru, Ti, V and Zn is provided at the surface of the glass substrate adjacent to the silver layer.

4. The mirror according to claim 3, wherein both Sn and Pd are provided at the surface of the glass substrate adjacent to the silver layer.

5. The mirror according to claim 2, wherein Pd is provided at the surface of the glass substrate adjacent to the silver layer.

6. The mirror according to claim 2, wherein the at least one material selected from the group consisting of Bi, Cr, Au, In, Ni, Pd, Pt, Rh, Ru, Sn, Ti, V and Zn is provided as islets at the surface of the glass substrate adjacent to the silver layer.

7. The minor according to claim 1, wherein Pd is provided at the surface of the silver coating layer which is adjacent to the paint layer overlaying the silver coating layer.

8. The mirror according to claim 1, wherein the at least one material selected from the group consisting of Pd, Eu, Pt, Ru, Na, Zr, Y and Rh is provided together with at least one material selected from the group consisting of Sn, Cr, V, Ti, Fe, In, Cu and Al at the surface of the silver coating layer which is adjacent to the paint layer overlaying the silver coating layer.

9. The mirror according to claim 8, wherein Pd is provided together with Sn at the surface of the silver coating layer which is adjacent to the paint layer overlaying the silver coating layer.

10. A mirror, which consists essentially of, in the order recited:
   a substrate in the form of a soda lime glass sheet, having a surface;
   palladium and tin provided at said surface of the glass sheet;
   a silver coating layer on said surface of the glass sheet, the silver layer having a surface adjacent to the glass sheet and a surface spaced from the glass sheet;
   palladium present at the surface of the silver coating layer spaced from the glass sheet; and
   at least one paint layer covering the silver coating layer,
wherein the mirror has no copper layer.

11. The mirror according to claim 1, wherein traces of silane are present at the surface of the silver coating layer which is adjacent to the paint layer overlaying the silver coating layer.

12. The mirror according to claim 1, wherein the at least one paint layer is substantially lead-free.

13. The mirror according to claim 1, wherein the at least one paint layer is lead-free.

14. The mirror according to claim 1, wherein the material provided at the surface of the silver coating layer which is adjacent to the paint layer is present in a quantity of less than 0.4 mg/m$^2$ of glass.

15. The mirror according to claim 1, wherein the at least one material selected from the group consisting of Pd, Eu, Pt, Ru, Na, Zr, Y and Rh is provided as islets at the surface of the silver coating layer which is adjacent to the paint layer.

16. The mirror according to claim 1 wherein the silver coating layer has a thickness of 60 to 110 nm.

17. The mirror according to claim 1, wherein the mirror has an average edge corrosion of less that 250 μm when subjected to a 120 hour CASS test.

18. The mirror according to claim 1 wherein the mirror has an average edge corrosion of less that 50 μm when subjected to a 480 hour Salt Fog test.

19. The mirror according to claim 10, wherein traces of silane are present at the surface of the silver coating layer which is adjacent to the paint layer overlaying the silver coating layer.

20. The mirror according to claim 10, wherein the at least one paint layer is substantially lead-free.

21. The minor according to claim 10, wherein the at least one paint layer is lead-free.

22. The mirror according to claim 10, wherein the silver coating layer has a thickness of 60 to 110 nm.

23. The mirror according to claim 10, wherein the mirror has an average edge corrosion of less that 250 μm when subjected to a 120 hour CASS test.

24. The mirror according claim 10, wherein the mirror has an average edge corrosion of less that 50 μm when subjected to a 480 hour Salt Fog test.

\* \* \* \* \*